United States Patent
Hatakeyama et al.

(10) Patent No.: US 10,582,113 B2
(45) Date of Patent: Mar. 3, 2020

(54) IMAGE PICKUP DEVICE, IMAGE PICKUP APPARATUS, IMAGE PICKUP APPARATUS CONTROL METHOD AND COMPUTER-READABLE NON-TRANSITORY RECORDING MEDIUM IN WHICH PROCESSING PROGRAM IS RECORDED

(71) Applicant: Olympus Corporation, Hachioji-shi, Tokyo (JP)

(72) Inventors: Ryo Hatakeyama, Hino (JP); Yoshinao Shimada, Hino (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/168,680

(22) Filed: Oct. 23, 2018

(65) Prior Publication Data
US 2019/0158759 A1    May 23, 2019

(30) Foreign Application Priority Data

Nov. 17, 2017    (JP) .................................. 2017-221727

(51) Int. Cl.
*H04N 5/232*    (2006.01)
*H04N 9/04*    (2006.01)
*H04N 5/3745*    (2011.01)

(52) U.S. Cl.
CPC ... *H04N 5/232122* (2018.08); *H04N 5/23227* (2018.08); *H04N 5/23229* (2013.01); *H04N 5/23235* (2013.01); *H04N 5/232411* (2018.08); *H04N 9/0451* (2018.08); *H04N 5/37457* (2013.01)

(58) Field of Classification Search
CPC ......... H04N 5/23212; H04N 5/232122; H04N 5/23227; H04N 5/23235; H04N 5/23241–232411; H04N 5/3696; H04N 5/3691
See application file for complete search history.

(56) References Cited

U.S. PATENT DOCUMENTS

2015/0323760 A1*    11/2015    Tomosada ................ G02B 7/28
250/201.2

FOREIGN PATENT DOCUMENTS

| JP | 2015-005853 | 1/2015 |
| JP | 2015-161906 | 9/2015 |

* cited by examiner

*Primary Examiner* — Paul M Berardesca
(74) *Attorney, Agent, or Firm* — John C. Pokotylo; Pokotylo Patent Service

(57) ABSTRACT

An image pickup device includes: a pixel area where each of color image pixels arrayed in a matrix is divided into a plurality of focus detection pixels; a vertical scanning circuit and a device control circuit configured to read from the pixel area a first frame capable of constituting a color image and a second frame including phase difference information; a digital processing circuit configured to reduce color information of the second frame to reduce an amount of data; and an output circuit configured to output the first frame and the second frame via a transmission route with a number of lanes that is not the smaller of a first number-of-lanes and a second number-of-lanes required to output the first frame and the second frame, respectively.

18 Claims, 17 Drawing Sheets

| | OUTPUT DATA | LV FRAME+PHASE DIFFERENCE INFORMATION (TB) | | | | PHASE DIFFERENCE INFORMATION (RL) | | | |
|---|---|---|---|---|---|---|---|---|---|
| IN THE CASE OF OUTPUTTING DATA AFTER BEING PROCESSED | | Lane0 | OPERATION | 40Mpix/sec | PIXEL DATA | Lane0 | OPERATION | 40Mpix/sec | PIXEL DATA |
| | | Lane1 | OPERATION | 40Mpix/sec | PIXEL DATA | Lane1 | OPERATION | 40Mpix/sec | PIXEL DATA |
| | | Lane2 | OPERATION | 40Mpix/sec | PIXEL DATA | Lane2 | OPERATION | 40Mpix/sec | PIXEL DATA |
| | | Lane3 | OPERATION | 40Mpix/sec | PIXEL DATA | Lane3 | OPERATION | 40Mpix/sec | PIXEL DATA |
| | | Lane4 | OPERATION | 40Mpix/sec | DUMMY | Lane4 | OPERATION | 40Mpix/sec | PIXEL DATA |
| | | Lane5 | OPERATION | 40Mpix/sec | DUMMY | Lane5 | OPERATION | 40Mpix/sec | PIXEL DATA |
| | | Lane6 | STOPPED | | | Lane6 | STOPPED | | |
| | | Lane7 | STOPPED | | | Lane7 | STOPPED | | |
| | | Lane8 | STOPPED | | | Lane8 | STOPPED | | |
| | | Lane9 | STOPPED | | | Lane9 | STOPPED | | |
| | | Lane10 | STOPPED | | | Lane10 | STOPPED | | |
| | | Lane11 | STOPPED | | | Lane11 | STOPPED | | |

FIG. 3

| | EXAMPLE OF 2PD PIXEL STRUCTURE | EXAMPLE OF 4PD PIXEL STRUCTURE |
|---|---|---|
| PLAN VIEW | PD, L, F; a, b | PD, L, F; a, c, b, d; PD |
| SIDE VIEW | L, F, PD | L, F, PD |

FIG. 5

| T | T | T | T | T | T |
|---|---|---|---|---|---|
| B | B | B | B | B | B |
| T | T | T | T | T | T |
| B | B | B | B | B | B |
| T | T | T | T | T | T |
| B | B | B | B | B | B |
| T | T | T | T | T | T |
| B | B | B | B | B | B |

FIG. 6

| R | L | R | L | R | L | R | L | R | L | R | L |
|---|---|---|---|---|---|---|---|---|---|---|---|
| R | L | R | L | R | L | R | L | R | L | R | L |
| R | L | R | L | R | L | R | L | R | L | R | L |
| R | L | R | L | R | L | R | L | R | L | R | L |

FIG. 7

| | 0 | 1 | 2 | 3 | 4 | 5 | | | | |
|---|---|---|---|---|---|---|---|---|---|---|
| 7 | GR R | B R | GR R | B R | GR R | B R | · | · | · | · |
|   | GR L | B L | GR L | B L | GR L | B L | · | · | · | · |
| 6 | R R | GB R | R R | GB R | R R | GB R | · | · | · | · |
|   | R L | GB L | R L | GB L | R L | GB L | · | · | · | · |
| 5 | GR R | B R | GR R | B R | GR R | B R | · | · | · | · |
|   | GR L | B L | GR L | B L | GR L | B L | · | · | · | · |
| 4 | R R | GB R | R R | GB R | R R | GB R | · | · | · | · |
|   | R L | GB L | R L | GB L | R L | GB L | · | · | · | · |
| 3 | GR R | B R | GR R | B R | GR R | B R | · | · | · | · |
|   | GR L | B L | GR L | B L | GR L | B L | · | · | · | · |
| 2 | R R | GB R | R R | GB R | R R | GB R | · | · | · | · |
|   | R L | GB L | R L | GB L | R L | GB L | · | · | · | · |
| 1 | GR R | B R | GR R | B R | GR R | B R | · | · | · | · |
|   | GR L | B L | GR L | B L | GR L | B L | · | · | · | · |
| 0 | R R | GB R | R R | GB R | R R | GB R | · | · | · | · |
|   | R L | GB L | R L | GB L | R L | GB L | · | · | · | · |

FIG. 9

0TH ROW:

| R (0,0) L | R (0,0) R | GR (1,0) L | GR (1,0) R | R (2,0) L | R (2,0) R | GR (3,0) L | GR (3,0) R | R (4,0) L | R (4,0) R | GR (5,0) L | GR (5,0) R | R (6,0) L | R (6,0) R | GR (7,0) L | GR (7,0) R |

1ST ROW:

| GB (0,1) L | GB (0,1) R | B (1,1) L | B (1,1) R | GB (2,1) L | GB (2,1) R | B (3,1) L | B (3,1) R | GB (4,1) L | GB (4,1) R | B (5,1) L | B (5,1) R | GB (6,1) L | GB (6,1) R | B (7,1) L | B (7,1) R |

DATA BEFORE BEING PROCESSED

IMAGE PICKUP DEVICE, IMAGE PICKUP APPARATUS, IMAGE PICKUP APPARATUS CONTROL METHOD AND COMPUTER-READABLE NON-TRANSITORY RECORDING MEDIUM IN WHICH PROCESSING PROGRAM IS RECORDED

CROSS REFERENCE TO RELATED APPLICATION

This application claims benefit of Japanese Application No. 2017-221727 filed in Japan on Nov. 17, 2017, the entire contents of which are incorporated herein by this reference.

BACKGROUND OF THE INVENTION

1. Field of the Invention

The present invention relates to an image pickup device in which an image pixel is divided into a plurality of focus detection pixels, an image pickup apparatus provided with the image pickup device, a method for controlling the image pickup apparatus, and a computer-readable non-transitory recording medium in which a processing program is recorded.

2. Description of the Related Art

Various kinds of image pickup apparatuses in which an image pixel is divided into a plurality of focus detection pixels and which reads an image pixel signal and a focus detection pixel signal have conventionally been proposed.

For example, Japanese Patent Application Laid-Open Publication No. 2015-161906 describes an image pickup apparatus including: first pixel columns arrayed in a predetermined scanning direction and including focus detection pixel columns configured to output a focus detection signal about the scanning direction; second pixel columns arrayed in the scanning direction and including image pixel columns for outputting an image signal and not including focus detection pixel columns; a signal reading portion configured to perform reading of the focus detection signal from the first pixel columns and reading of the image signal from the second pixel columns alternatively and asynchronously; an image data generating portion configured to generate image data based on the image signal read by the signal reading portion; and a focus detecting portion configured to detect a focus adjustment state of an image forming optical system based on the focus detection signal read by the signal reading portion; wherein reading of the image signal and reading of the focus detection signal are asynchronously controlled.

Japanese Patent Application Laid-Open Publication No. 2015-5853 describes an image pickup device including: unit pixels each of which includes first and second photoelectric conversion portions; and a reading circuit configured to hold any one of a first signal by the first photoelectric conversion portion, a second signal by the second photoelectric conversion portion outputted from the unit pixels, and a third signal obtained by combining the first signal and the second signal; wherein first continuous drive to perform reading of the first signal and reading of the second signal and second continuous drive to perform reading of the third signal are switched at a predetermined timing.

SUMMARY OF THE INVENTION

An image pickup device according to one aspect of the present invention is an image pickup device for outputting data via a transmission route with a plurality of lanes, and the image pickup device includes: a pixel area where color image pixels are arrayed in a matrix, and each of the image pixels is divided into a plurality of focus detection pixels; a reading circuit configured to read a first frame capable of constituting a color image and a second frame including phase difference information from the pixel area; a signal processing circuit configured to perform processing for reducing color information of the second frame to reduce an amount of data; and an output circuit configured to output both of the first frame and the second frame via the transmission route with a number of lanes that is not the smaller of a first number-of-lanes required to output the first frame and a second number-of-lanes required to output the second frame processed by the signal processing circuit.

An image pickup apparatus according to another aspect of the present invention includes: the image pickup device described above; and a transmission route with a plurality of lanes configured to transmit data outputted from the image pickup device, wherein an operation of the transmission route is stopped for a lane that is not used for transmission of data among the plurality of lanes of the transmission route.

An image pickup apparatus control method according to another aspect of the present invention is a method for controlling an image pickup apparatus, the image pickup apparatus including: an image pickup device including a pixel area where color image pixels are arrayed in a matrix, and each of the image pixels is divided into a plurality of focus detection pixels, and a transmission route with a plurality of lanes configured to transmit data outputted from the image pickup device, the method including: reading from the pixel area a first frame capable of constituting a color image and a second frame including phase difference information; performing signal processing for reducing color information of the second frame to reduce an amount of data; outputting both of the first frame and the second frame via the transmission route with a number of lanes that is not the smaller of a first number-of-lanes required to output the first frame and a second number-of-lanes required to output the signal-processed second frame; and stopping an operation of the transmission route for a lane that is not used for transmission of data among the plurality of lanes of the transmission route.

A computer-readable non-transitory recording medium in which a processing program is recorded, according to another aspect of the present invention is a computer-readable non-transitory recording medium in which a processing program for controlling an image pickup apparatus is recorded, the image pickup apparatus including: an image pickup device including a pixel area where color image pixels are arrayed in a matrix and each of the image pixels is divided into a plurality of focus detection pixels, and a transmission route with a plurality of lanes configured to transmit data outputted from the image pickup device; and the processing program is a program for causing a computer to perform: reading from the pixel area a first frame capable of constituting a color image and a second frame including phase difference information; performing signal processing for reducing color information of the second frame to reduce an amount of data; outputting both of the first frame and the second frame via the transmission route with a number of lanes that is not the smaller of a first number-of-lanes required to output the first frame and a second number-of-lanes required to output the signal-processed second frame; and stopping an operation of the transmission route for a lane that is not used for transmission of data among the plurality of lanes of the transmission route.

BRIEF DESCRIPTION OF THE DRAWINGS

FIG. 3 is a diagram showing examples of a pixel structure in which two or four photodiodes are arranged in one microlens in the first embodiment;

FIG. 5 is a diagram showing an example of first mix processing performed for a first frame in the first embodiment;

FIG. 6 is a diagram showing an example of second mix processing performed for a second frame in the first embodiment;

FIG. 7 is a diagram showing a pixel array of the second frame after being read from a pixel portion and mix-processed in the first embodiment;

FIG. 9 is a diagram showing an example of data of the second frame before digital processing, which is inputted to the digital processing portion, in the first embodiment;

DETAILED DESCRIPTION OF THE PREFERRED EMBODIMENTS

Embodiments of the present invention will be described below with reference to drawings.

First Embodiment

Figure 1:
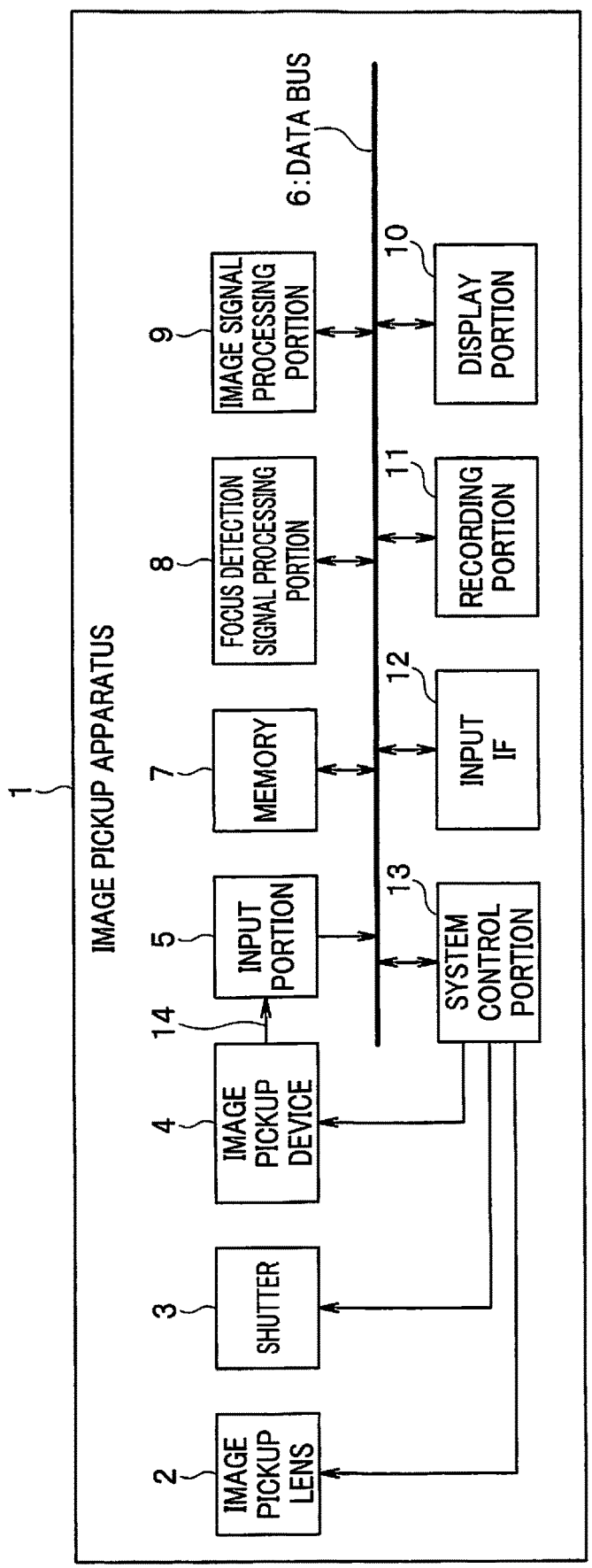
FIG. 1 is a block diagram showing a configuration of an image pickup apparatus in a first embodiment of the present invention.

FIGS. 1 to 12 show a first embodiment of the present invention, and FIG. 1 is a block diagram showing a configuration of an image pickup apparatus.

As shown in FIG. 1, an image pickup apparatus 1 is provided with an image pickup lens 2, a shutter 3, an image pickup device 4, an input portion 5, a data bus 6, a memory 7, a focus detection signal processing portion 8, an image signal processing portion 9, a display portion 10, a recording portion 11, an input interface (an input IF) 12, a system control portion 13 and a transmission route 14, and is provided with functions like a camera.

The image pickup lens 2 is a photographing optical system for forming an optical image of an object on the image pickup device 4. The image pickup lens 2 is provided with a focus lens for adjusting a focus position and an optical aperture configured to control a range of a light flux that passes through the image pickup lens 2, and is configured, for example, as a zoom lens the focus distance of which is variable. The focus position, optical aperture opening diameter (F value) and focal distance of the image pickup lens 2 are changed by drive control by the system control portion 13.

The shutter 3 controls a time period required for a light flux from the image pickup lens 2 to reach the image pickup device 4 and is a mechanical shutter configured to cause a shutter curtain to travel, for example, a focal plane shutter curtain. Opening and closing operations of the shutter 3 is drive-controlled by the system control portion 13.

The image pickup device 4 includes a pixel portion 22 (see FIG. 2) that is a pixel area where image pixels of a plurality of colors are arrayed two-dimensionally (in a matrix). Each image pixel corresponds to a microlens L (see FIG. 3) and is configured being divided into a plurality of focus detection pixels. Here, the focus detection pixels perform photoelectric conversion of light fluxes passing through areas obtained by performing pupil-division of an exit pupil of the image pickup lens 2, which is a photographing optical system, into a plurality of parts, respectively, and generate photoelectric conversion signals. Thus, it can be said that a plurality of focus detection pixels are arrayed two-dimensionally (in a matrix) in the pixel portion 22.

Then, based on control by the system control portion 13, the image pickup device 4 performs photoelectric conversion as described above for an optical image of an object formed by the image pickup lens 2 through the shutter 3 to generate a plurality of photoelectric conversion signals.

The image pickup device 4 as described above is configured, for example, as a single-plate-type CMOS image pickup device provided with color filters in a primary color Bayer array but is, of course, not limited to the configuration.

The image pickup device 4 is adapted to be capable of performing mix reading of performing mix processing (processing for performing at least either pixel addition (either simple addition or weighted addition (including pixel addition averaging in the case of the normalized same weight) is possible) or pixel thinning-out to decrease the number of pixels outputted from the image pickup device 4) for a plurality of image pixels of the same color to read the plurality of image pixels. For the mix processing, a different number of mixes is set according to whether an image to be outputted from the image pickup device 4 is an image for live view (LV), an image for movie, an image for a still image or the like (that is, according to a purpose of the image).

The image pickup device 4 is configured to output data via the transmission route 14 with a plurality of lanes. That is, the transmission route 14 configured to output pixel data (pixel signals) generated by the image pickup device 4 is provided with a plurality of lanes. An example where twelve lanes of lanes 0 to 11 are provided will be described later.

Data from the image pickup device 4 is inputted into the input portion 5, and is connected to the image pickup device 4 via the transmission route 14 with the plurality of lanes described above.

Thus, the image pickup apparatus 1 is configured being provided with the image pickup device 4 and the transmission route 14 with the plurality of lanes configured to transmit data outputted from the image pickup device 4, and is adapted to reduce power consumption by stopping operations of lanes that are not used for transmission of data among the plurality of lanes of the transmission route 14 as described later.

The data bus 6 is a transfer path for transferring various kinds of data and control signals from a certain place to another place in the image pickup apparatus 1. The data bus 6 in the present embodiment is connected to the input portion 5, the memory 7, the focus detection signal processing portion 8, the image signal processing portion 9, the display portion 10, the recording portion 11, the input IF 12 and the system control portion 13.

The memory 7 is a storage portion configured to temporarily store pixel signals generated by the image pickup device 4 and is configured, for example, with a DRAM (dynamic random access memory) or the like. The memory 7 is also used as a work memory or an image buffer memory at the time of each portion in the image pickup apparatus 1 performing various kinds of processing such as image processing and focus detection.

The focus detection signal processing portion 8 performs image surface phase difference detection based on a pair of focus detection pixel signals outputted from the image pickup device 4.

The focus detection signal processing portion 8 in the present embodiment is further capable of performing focus detection based on contrast of image pixel signals (contrast AF) in addition to focus detection by a phase difference detection method based on focus detection pixel signals (phase difference AF).

The focus detection signal processing portion 8 calculates a lens control parameter for moving a focus position of the image pickup lens 2 to a focused position, based on a result of focus detection. The focus detection signal processing portion 8 is also capable of performing an arithmetic operation for focus detection pixel signals to calculate, for example, 3D information, a depth map, depth correction information or the like. If having calculated the 3D information, the depth map, the depth correction information or the like, the focus detection signal processing portion 8 transmits a result of the calculation to the image signal processing portion 9.

The image signal processing portion 9 performs image processing for image pixel signals outputted from the image pickup device 4 to generate an image for display and/or recording (for example, an image to be displayed on the display portion 10 and an image to be recorded in the recording portion 11).

More specifically, the image signal processing portion 9 performs image processing such as OB subtraction, white balance (WB) gain, demosaicking, noise reduction, color conversion, gamma conversion and enlargement/reduction (including so-called development processing) for image pixel signals. Note that data compression/data decompression at the time of recording or reading a still image or movie in or from the recording portion 11 may be performed by the image signal processing portion 9 or may be performed by providing a dedicated compression/decompression portion.

The display portion 10 is a display device configured to display an image and display various kinds of information related to the image pickup apparatus 1. The display portion 10 includes a device such as an LCD panel or an organic electroluminescence (organic EL) display. As specific arrangements and configurations of the display portion 10, an electronic view finder (EVF), a back panel of the image pickup apparatus 1, a display device of a mobile device wirelessly connected to the image pickup apparatus 1 and the like are given. Therefore, the display portion 10 is not limited to a configuration specific to the image pickup apparatus 1.

The recording portion 11 is a recording medium configured to nonvolatilely store image data (still image data, movie data or the like) configured with a plurality of pixel signals and is configured with, for example, a flash memory included in a body of the image pickup apparatus 1 or a memory card attachable to and detachable from the body of the image pickup apparatus 1. Therefore, the recording portion 11 is not limited to a configuration specific to the image pickup apparatus 1.

The input IF 12 is for performing various kinds of operation inputs to the image pickup apparatus 1. The input IF 12 includes operation buttons, for example, a power source button for turning on/off a power source of the image pickup apparatus 1, a release button including, for example, a two-stage switch (a first release (1R) switch and a second release (2R) switch) for instructing start of photographing of a still image or the like, a movie button for instructing shooting a movie, a reproduction button for reproducing a recorded image, a menu button for performing setting and the like of the image pickup apparatus 1, a cross key used for an operation of selecting an item, and an OK button used for an operation of deciding a selected item.

Here, items that can be set using the menu button, the cross key, the OK button and the like include, for example, photographing modes (a still image mode, a movie mode and the like), recording modes (JPEG recording, RAW+JPEG recording and the like) and a reproduction mode.

When an operation is performed to the input IF 12, a signal corresponding to content of the operation is outputted to the system control portion 13.

Note that as specific arrangement and configurations of the input IF 12, buttons and switches arranged on an exterior of a camera body, a touch panel provided on a display surface of the back panel of the display portion 10, and a remote release device and a mobile device for performing a remote operation and the like are given. Therefore, the input IF 12 is not limited to a configuration specific to the image pickup apparatus 1, either.

The system control portion 13 is a control portion configured, for example, including a CPU and is configured to comprehensively control the respective portions in the image pickup apparatus 1.

The system control portion 13 executes various kinds of sequences corresponding to operation inputs from the input IF 12 in accordance with a predetermined processing program (including an image pickup program). Here, the processing program may be nonvolatilely stored in the system control portion 13, or a configuration is also possible in which the processing program is nonvolatilely stored in the memory 7 and read by the system control portion 13.

For example, the system control portion 13 controls the focus lens of the image pickup lens 2 based on a lens control parameter calculated by the focus detection signal processing portion 8, controls the aperture of the image pickup lens 2 and the shutter 3 based on a result of an exposure calculation performed in the system control portion 13, and controls the image pickup device 4 to cause the image pickup device 4 to perform image pickup and output a pixel signal. The system control portion 13 also performs control to display various kinds of information on the display portion 10, control to record data in the recording portion 11 or read data from the recording portion 11, and the like.

Figure 2:
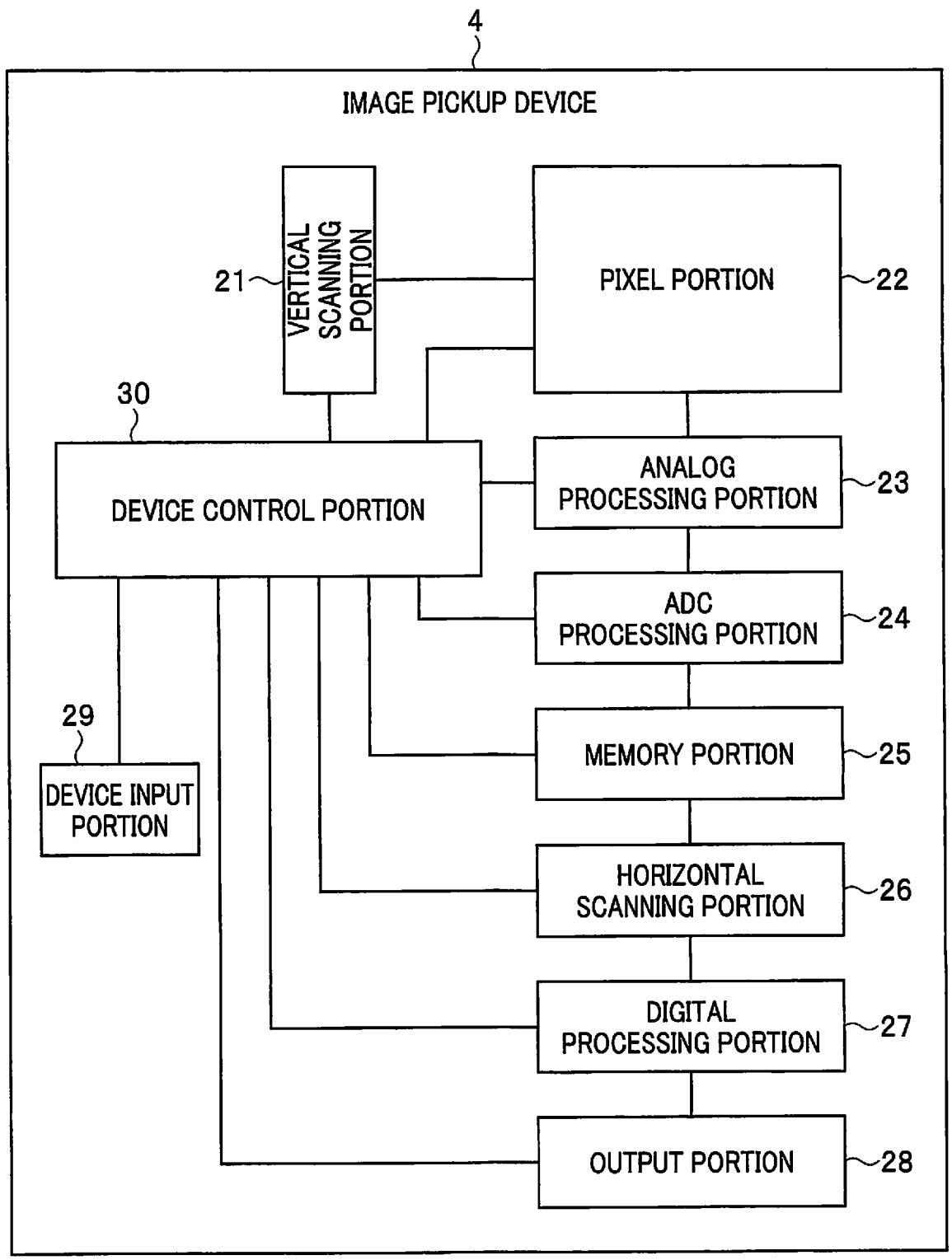
FIG. 2 is a block diagram showing a configuration of an image pickup device in the first embodiment.

Next, FIG. 2 is block diagram showing a configuration of the image pickup device 4.

The image pickup device 4 includes image pixels each of which is divided into a plurality of focus detection pixels and generates image pixel signals and focus detection pixel signals based on photoelectric conversion signals generated by performing photoelectric conversion of light fluxes with the focus detection pixels.

In the example shown in FIG. 2, the image pickup device 4 is provided with a vertical scanning portion 21, the pixel portion 22, an analog processing portion 23, an ADC processing portion 24, a memory portion 25, a horizontal scanning portion 26, a digital processing portion 27, an output portion 28, a device input portion 29 and a device control portion 30.

Figure 4:
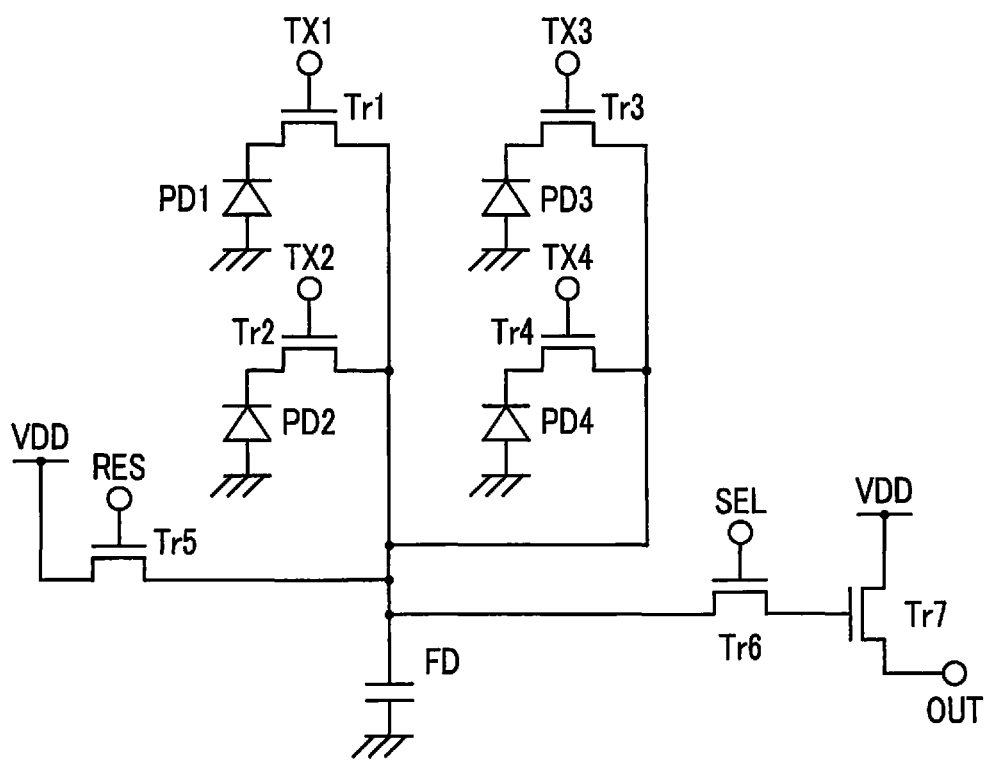
FIG. 4 is a circuit diagram showing an example of a configuration of pixels of a 4PD pixel structure in the first embodiment.

As described above, the pixel portion 22 is a pixel array portion where image pixels (that is, focus detection pixels) are arrayed in a matrix (in a vertical direction (a column direction) and a horizontal direction (a row direction)). For example, image pixels of colors with a Bayer array is constituted by 2×2 pixels as a basic array (see FIG. 7 and the like, too). Generation of image pixel signals and focus detection pixel signals based on photoelectric conversion signals is performed by an operation of a circuit as shown in FIG. 4 to be described later.

Here, FIG. 3 is a diagram showing examples of a pixel structure in which two or four photodiodes PD are arranged in one microlens L.

FIG. 3 illustrates a 2PD pixel structure in which two photodiodes PD are arranged for the one microlens L and a 4PD pixel structure in which four photodiodes PD are arranged for the one microlens L as image pixel structures.

A pixel is configured such that, in a lamination direction from an object side to an image side, the microlens L, a color filter F and the photodiodes PD are arranged in that order. Here, the microlens L causes an amount of light which reaches the image pixel to increase by condensing light, and substantially enlarges an aperture ratio of the image pixel. If the color filter F is, for example, a color filter in a primary color Bayer array, any of an R filter, a G filter and a B filter is arranged according to a position of the pixel.

Here, in the case of the 2PD pixel structure shown in FIG. 3, the two photodiodes PD are arranged in an image forming range of the one microlens L. The two photodiodes PD are horizontally divided in two if the photodiodes PD are for detecting a horizontal-direction phase difference, and are vertically divided in two if the photodiodes PD are for detecting a vertical-direction phase difference. Thereby, two focus detection pixels a and b are configured.

In the case of the 4PD pixel structure shown in FIG. 3, the four photodiodes PD are arranged in the image forming range of the one microlens L. The four photodiodes PD are vertically and horizontally divided in four so that phase differences in the horizontal and vertical directions can be detected (that is, the four photodiodes PD are arranged at upper left, lower left, upper right and lower right positions, respectively). Four focus detection pixels a, b, c and d are thereby configured.

Description will be made below on a case where all pixels of the pixel portion 22 have the 4PD pixel structure as an example (however, it is also possible that a part of the pixels of the pixel portion 22 have the 4PD pixel structure or the 2PD pixel structure). Here, if all the pixels of the pixel portion 22 have the 4PD pixel structure, a pixel signal outputted from each photodiode PD is a focus detection pixel signal.

Furthermore, in the case of performing addition of two vertical pixels for outputs from the photodiodes PD, for example, by a circuit configuration of FIG. 4 to be described later, that is, in the case of calculating (a+b) and (c+d) in FIG. 3, focus detection pixel signals for detecting a horizontal-direction phase difference (vertical line detection) are obtained.

In the case of performing addition of two horizontal pixels for outputs from the photodiodes PD similarly, that is, in the case of calculating (a+c) and (b+d) in FIG. 3, focus detection pixel signals for detecting a vertical-direction phase difference (horizontal line detection) are obtained.

In the case of the 4PD pixel structure shown in FIG. 3, either the focus detection pixel signals for vertical line detection or the focus detection pixel signals for horizontal line detection becomes a pair of focus detection pixel signals in a first pupil division direction and the remaining signals become a pair of focus detection pixel signals in a second pupil division direction.

In addition, in the case of performing addition of four pixels for outputs of the photodiodes PD similarly, that is, in the case of calculating (a+b+c+d) in FIG. 3, an image pixel signal is obtained.

The vertical scanning portion 21 is a vertical scanning circuit configured to perform scanning in the vertical direction by sequentially selecting horizontal-direction lines (rows) of pixels of the pixel portion 22. By the vertical scanning portion 21 selecting a particular row to reset or transfer each pixel existing on the selected row, a pixel charge accumulation time period (an exposure time period) for the pixel is controlled. The vertical scanning portion 21 and the device control portion 30 are adapted to function as a reading portion (a reading circuit) configured to read a first frame capable of constituting a color image and a second frame including phase difference information from the pixel portion 22.

The analog processing portion 23 is a circuit configured to perform analog signal processing of analog pixel signals read from the pixel portion 22. The analog processing portion 23 includes, for example, a preamplifier configured to amplify the pixel signals, an OB clamp circuit configured to adjust a black level, a correlated double sampling (CDS) circuit configured to reduce reset noise of the pixel signals, and the like. The analog processing portion 23 is also adapted to function as a mix processing portion (a mix processing circuit) configured to perform mix processing for a plurality of pixels of the same color. That is, the analog processing portion 23 is a mix processing portion (a mix processing circuit) configured to perform mix processing of generating one pixel signal from a plurality of pixel signals, perform first mix processing for the first frame and perform second mix processing for the second frame (however, there may be a case where the mix processing is performed for one of the first frame and second frame and is not performed for the other).

The analog-digital conversion processing portion (the ADC processing portion) 24 is an analog-digital conversion processing circuit (an ADC processing circuit) configured to convert analog signals (analog pixel signals) read from the pixel portion 22 by the vertical scanning portion 21 and the device control portion 30 and outputted from the analog processing portion 23 to digital signals (digital pixel signals) and is provided on a preceding stage side of the digital processing portion 27. For the ADC processing portion 24, such a configuration as is represented by a configuration of a column ADC is adopted in which pixel signals read from the pixel portion 22 are AD-converted by an analog-digital converter (ADC) for each column.

The memory portion 25 is configured with a volatile memory circuit or the like configured to temporarily hold the pixel signals converted by the ADC processing portion 24.

The horizontal scanning portion 26 reads the pixel signals (image pixel signals and focus detection pixel signals) from the memory portion 25 in order of columns.

The digital processing portion 27 is a digital processing circuit for performing digital arithmetic processing for the pixel signals read by the horizontal scanning portion 26. The digital processing portion 27 is a signal processing portion (a signal processing circuit) configured to perform processing for reducing color information of the second frame from the first frame capable of constituting a color image and the second frame including phase difference information, which have been read from the pixel portion 22 by the reading portion (the reading circuit), to reduce an amount of data. Note that although the processing for reducing the color information of the second frame may be performed, for example, by the analog processing portion 23 instead of the digital processing portion 27, digital processing is adopted here because analog processing causes a circuit configuration to be complicated.

The output portion 28 is an output circuit configured to array pixel signals outputted from the digital processing portion 27 to generate a pixel signal string, convert the pixel signal string to an output signal format such as a serial signal or a differential signal and output the signal from an output terminal of the image pickup device 4. The output portion 28 is connected to the above-stated input portion 5 in the image pickup apparatus 1 via the transmission route 14 with the plurality of lanes as described above.

The device input portion 29 receives a synchronization signal, a reference clock, operation setting information (for example, operation mode information) and the like related to control of the image pickup device 4, from the system control portion 13.

The device control portion 30 is a device control circuit configured to control each block in the image pickup device 4 based on the operation setting information according to the synchronization signal and the reference clock received via the device input portion 29. Via which lane of the transmission route 14 the output portion 28 is to output data is controlled by the device control portion 30 that is in cooperation with the system control portion 13. For which lane of the transmission route 14 the operation is to be stopped is controlled by the system control portion 13.

FIG. 4 is a circuit diagram showing an example of a configuration of pixels of the 4PD pixel structure.

On a pixel with the 4PD pixel structure, four photodiodes PD1 to PD4 are arranged at positions corresponding to one microlens L. More specifically, the four photodiodes PD1 to PD4 are arranged at upper left, lower left, upper right and lower right positions, respectively, in a range of the microlens L where an optical image is formed.

Transistors Tr1 to Tr4 functioning as switches are connected to the four photodiodes PD1 to PD4, respectively, and on/off of each of the transistors Tr1 to Tr4 is controlled by applying control signals TX1 to TX4 to the transistors Tr1 to Tr4, respectively, from the vertical scanning portion 21.

Each of the transistors Tr1 to Tr4 is connected to a floating diffusion FD, and a signal charge of a photodiode PD corresponding to a transistor Tr that has been turned on is transferred to the floating diffusion FD.

One end of a transistor Tr5 functioning as a switch is connected to the floating diffusion FD and the transistors Tr1 to Tr4, and the other end of the transistor Tr5 is connected to a power source voltage VDD. By applying a reset signal RES to the transistor Tr5, on/off on the power source voltage VDD side and the floating diffusion FD side is controlled. According to such a configuration, the floating diffusion FD is reset by turning on the transistor Tr5. By further turning on the transistor Tr5, in a state in which the transistors Tr1 to Tr4 are turned on, the photodiodes PD1 to PD4 are reset.

The floating diffusion FD is connected to an output terminal OUT via a transistor Tr6 functioning as a switch and a transistor Tr7 connected to the power source voltage VDD and functioning as an amplifying portion.

By applying a selection signal SEL to the transistor Tr6, a voltage value of the floating diffusion FD is amplified by the transistor Tr7 and read from the output terminal OUT.

In such a pixel circuit with the 4PD pixel structure, by turning on any one of the transistors Tr1 to Tr4, a charge of one corresponding photodiode among the photodiodes PD1 to PD4 is transferred to the floating diffusion FD and can be read from the output terminal OUT.

For example, by turning on the transistors Tr1 and Tr2 and turning off the transistors Tr3 and Tr4, charges of the photodiodes PD1 and PD2 are transferred to the floating diffusion FD and added, and can be read from the output terminal OUT.

Similarly, for example, by turning on the transistors Tr3 and Tr4 and turning off the transistors Tr1 and Tr2, charges of the photodiodes PD3 and PD4 are transferred to the floating diffusion FD and added, and can be read from the output terminal OUT.

Thus, by performing addition of two vertical pixels, that is, by calculating (a+b) and (c+d) in FIG. 3, focus detection pixel signals for detecting a horizontal-direction phase difference (vertical line detection) can be obtained.

Furthermore, for example, by turning on the transistors Tr1 and Tr3 and turning off the transistors Tr2 and Tr4, charges of the photodiodes PD1 and PD3 are transferred to the floating diffusion FD and added, and can be read from the output terminal OUT.

Similarly, for example, by turning on the transistors Tr2 and Tr4 and turning off the transistors Tr1 and Tr3, charges of the photodiodes PD2 and PD4 are transferred to the floating diffusion FD and added, and can be read from the output terminal OUT.

Thus, by performing addition of two horizontal pixels, that is, by calculating (a+c) and (b+d) in FIG. 3, focus detection pixel signals for detecting a vertical-direction phase difference (horizontal line detection) can be obtained.

In addition, by turning on all the transistors Tr1 to Tr4, charges of the photodiodes PD1 to PD4 are transferred to the floating diffusion FD and added, and can be read from the output terminal OUT.

Thus, by performing addition of two horizontal pixels× two vertical pixels, that is, calculating (a+b+c+d) in FIG. 3, an image pixel signal can be obtained.

FIG. 5 is a diagram showing an example of the first mix processing performed for the first frame, and FIG. 6 is a diagram showing an example of the second mix processing performed for the second frame.

The first frame is a frame capable of constituting a color image as described above, and an image pixel signal of, for example, (a+b+c+d), is read by one of two subframes (that may be referred to as fields) constituting the first frame, and a focus detection pixel signal T of, for example, (a+c), is read by the other subframe.

When the signals are read in such a scheme, it is possible to, by performing an arithmetic operation of (a+b+c+d)−(a+c) in the focus detection signal processing portion 8 of the image pickup apparatus 1, obtain a focus detection pixel signal B of (b+d) paired with the focus detection pixel signal T of (a+c). The reading scheme is called a subtraction reading scheme.

Note that at the time of performing horizontal line detection, it is also possible to read (a+b+c+d) and (b+d) and determine (a+c) by an arithmetic operation.

Instead of the subtraction reading scheme, a simple reading scheme of reading the focus detection pixel signal T of (a+c) and the focus detection pixel signal B of (b+d) may be adopted. In this case, by performing an arithmetic operation of (a+c)+(b+d) in the image signal processing portion 9 of the image pickup apparatus 1, an image pixel signal of (a+b+c+d) can be obtained.

The second frame is a frame including phase difference information as described above and is, here, adapted to acquire a focus detection pixel signal for vertical line detection because the focus detection pixel signal for horizontal line detection is acquired by the first frame. (However, the focus detection pixel signal for vertical line detection may be acquired by the first frame, and the focus detection pixel signal for horizontal line detection may be acquired by the second frame.) (As another alternative, only one of the focus detection pixel signal for vertical line detection and the focus detection pixel signal for horizontal line detection may be acquired by the first and second frames.)

More specifically, for example, a focus detection pixel signal L of (a+b) is read by one of the subframes constituting the second frame, and, for example, a focus detection pixel signal R of (c+d) is read by the other frame.

A live view is hereinafter assumed as an example, and it is assumed that the first frames and the second frames are alternately read (but this is not limitative).

For the first frame read from the pixel portion 22, for example, H3×V3 mix processing for three horizontal-direction pixels×three vertical-direction pixels as shown in FIG. 5 is performed. Here, the pixel array shown in FIG. 5 shows an array obtained when only pixel signals of any color among color pixel signals read from the pixel portion 22 are re-arranged (alternatively, it may be said that the pixel array shown in FIG. 5 is made for an arbitrary color).

Therefore, focus detection pixel signals T read by one of the paired subframes constituting the first frame is H3×V3 mix-processed for each color. Furthermore, image pixel signals read by the other of the paired subframes constituting the first frame is H3×V3 mix-processed for each color. The H3×V3 mix processing is processing assuming a display image for a live view (and assuming reduction in power consumption by reduction in the number of pixels).

The number of pixels is thereby reduced to ⅑ as for the first frame.

For the second frame read from the pixel portion 22, H1×V3 mix processing for three vertical-direction pixels, for example, as shown in FIG. 6 is performed. It is similar to FIG. 5 described above that a pixel array shown in FIG. 6 shows an array obtained when only pixel signals of any color among color pixel signals read from the pixel portion 22 are re-arranged (alternatively, the pixel array shown in FIG. 6 is made for an arbitrary color).

Therefore, focus detection pixel signals R read by one of the paired subframes constituting the second frame is H1×V3 mix-processed for each color. Focus detection pixel signals L read by the other of the paired subframes constituting the first frame is H1×V3 mix-processed for each color. The H1×V3 mix processing does not perform horizontal-direction mixing (but may be processing for reducing the number of mixes in the horizontal direction) and is processing assuming detection of a horizontal-direction phase difference at a high accuracy.

The number of pixels is thereby reduced to ⅓ as for the second frame.

FIG. 7 is a diagram showing a pixel array of the second frame after being read from the pixel portion 22 and mix-processed. Note that row numbers and column numbers (both are numbers corresponding to image pixels) after the mix processing are shown on an upper side and a left side of the pixel array of FIG. 7. In each of the arrayed pixels, an upper row shows a color (R (red), GR (green on the same row as red), GB (green on the same row as blue) or B (blue)) of the pixel, and a lower row shows the kind (R (right) or L (left)) of a focus detection pixel signal.

Since the mix processing is performed for pixels of the same color, the pixel array after the mix processing remains being the Bayer array.

Figure 8:
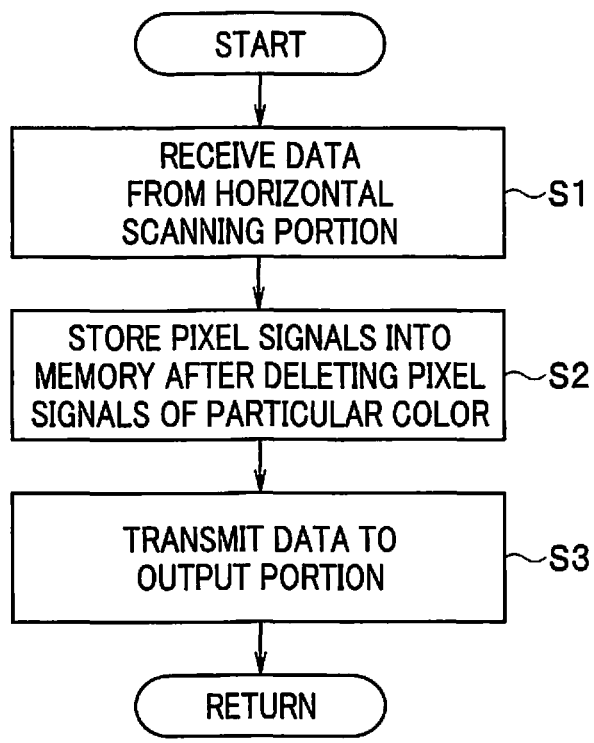
FIG. 8 is a flowchart showing processing performed for the second frame by a digital processing portion in the first embodiment.
Figure 10:
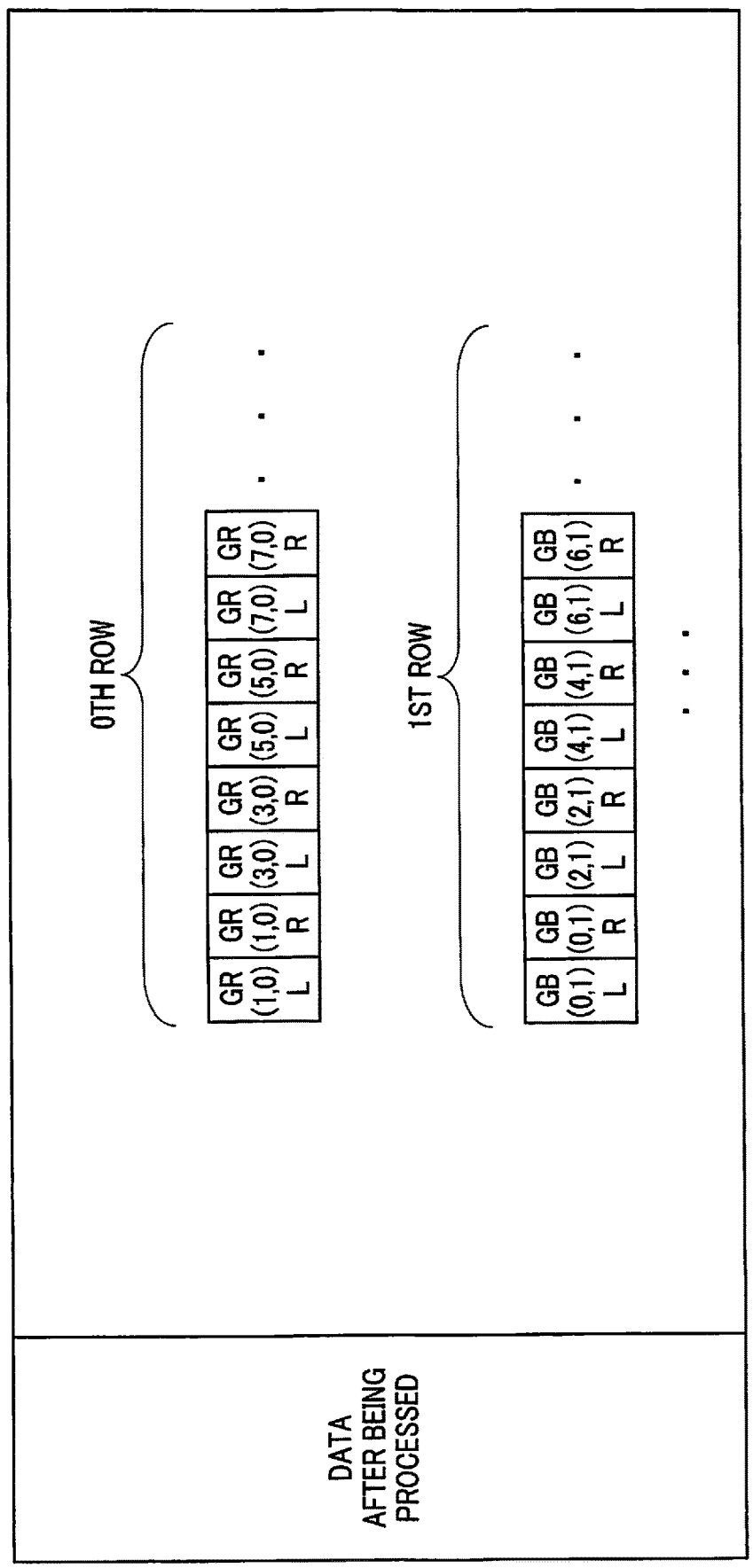
FIG. 10 is a diagram showing an example of data of the second frame after digital processing, which is outputted from the digital processing portion, in the first embodiment.

Next, processing performed for the second frame by the digital processing portion 27 will be described with reference to FIGS. 8 to 10. FIG. 8 is a flowchart showing the processing performed for the second frame by the digital processing portion 27; FIG. 9 is a diagram showing an example of data of the second frame before digital processing, which is inputted to the digital processing portion 27; and FIG. 10 is a diagram showing an example of data of the second frame after digital processing, which is outputted from the digital processing portion 27.

When the processing shown in FIG. 8 is started, the digital processing portion 27 receives data of the second frame as shown in FIG. 9 from the horizontal scanning portion 26 (step S1).

Then, the digital processing portion 27 reduces color information of the second frame to reduce an amount of the data, by deleting pixel signals of one or more colors among pixel signals of a plurality of colors read from color image pixels, that is, pixel signals of particular colors among inputted pixel signals of the respective colors. Then, the digital processing portion 27 stores pixel signals that have not been deleted, for example, in a memory in the digital processing portion 27 (step S2).

More specifically, the pixel signals of the plurality of colors are red (R) pixel signals, green (G) pixel signals and blue (B) pixel signals, and the digital processing portion 27 is adapted to reduce the color information of the second frame to reduce the amount of data, by deleting the R pixel signals and the B pixel signals and configuring the second frame only with the G pixel signals (more particularly, right (R) focus detection pixel signals of GR color, left (L) focus detection pixel signals of the GR color, right (R) focus detection pixel signals of GB color and left (L) focus detection pixel signals of the GB color).

Note that since G pixel signals are signals corresponding to brightness, and it is thought that, in the case of a general object, the G pixel signals are most efficiently responsible for phase difference information, among the pixel signals of the respective colors of R, G and B, the R and B pixel signals are deleted, and the G pixel signals are left here. However, this is not limitative. For example, in the case of an inside of a living body, there may be a case where R pixel signals are efficiently responsible for phase difference information. Furthermore, an object in which B pixel signals are efficiently responsible for phase difference information is also conceivable. Therefore, a color signal to be deleted may be any signal constituting a color image and may be appropriately set according to an object.

After that, the digital processing portion 27 transmits the pixel signals stored in the memory to the output portion 28 as shown in FIG. 10 (step S3) and returns to a main process not shown.

As seen from comparison between FIGS. 9 and 10, the amount of data outputted from the digital processing portion 27 is half the amount of data inputted to the digital processing portion 27.

Next, an operation of the transmission route 14 with the plurality of lanes connecting the output portion 28 of the image pickup device 4 and the input portion 5 in the image pickup apparatus 1 will be described with reference to FIGS. 11 and 12.

Figure 11:
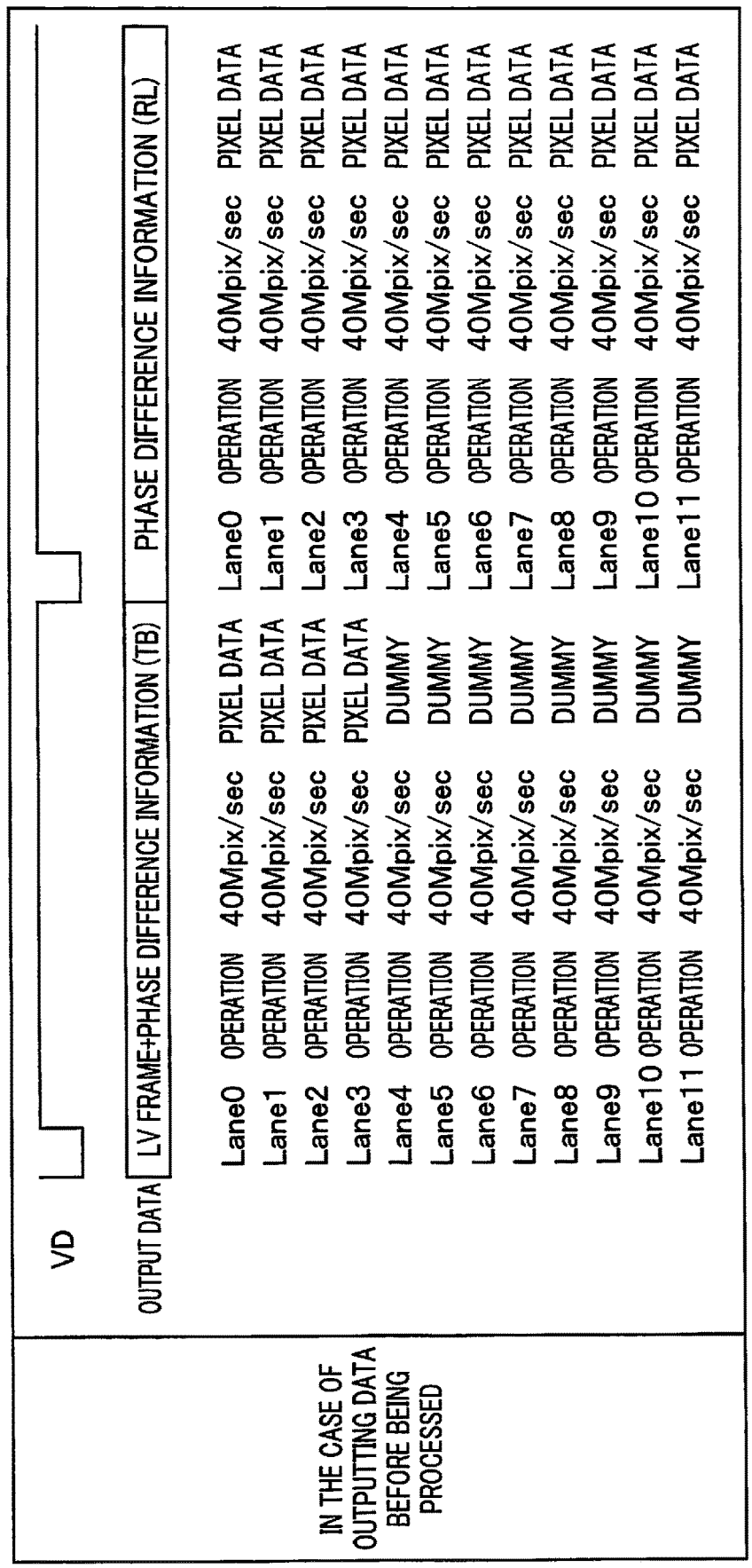
FIG. 11 is a diagram showing a usage state of each lane at the time of outputting pixel data from an output portion without performing the processing by the digital processing portion, in the first embodiment.

First, FIG. 11 is a diagram showing a usage state of each lane at the time of outputting pixel data from the output portion 28 without performing the processing by the digital processing portion 27.

In the case of not performing the processing by the digital processing portion 27, the data inputted to the digital processing portion 27 as shown in FIG. 9 is outputted from the output portion 28 as it is.

Figure 12:
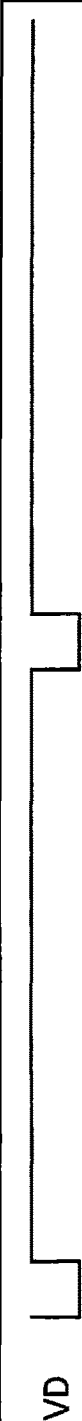
FIG. 12 is a diagram showing a usage state of each lane at the time of outputting pixel data from the output portion after the processing by the digital processing portion, in the first embodiment.

FIG. 12 is a diagram showing a usage state of each lane at the time of outputting pixel data from the output portion 28 after the processing by the digital processing portion 27.

Here, description will be made on a case where the image pickup device 4 is provided with the pixel portion 22 with 12 megapixels (Mpix) and an aspect ratio of 4:3 as an example.

A case is assumed where, as described above, the first frame (a frame capable of constituting a color image and capable of acquiring, for example, vertical-direction phase difference information (TB)) is, for example, H3×V3 mix-processed; the second frame (a frame capable of acquiring, for example, horizontal-direction phase difference information (RL)) is, for example, H1×V3 mix-processed; and first frames and second frames are alternately acquired.

At this time, the number of pixels of an image of the first frame is:

(12 megapixels)/9×2=2.67 megapixels.

The number of pixels of an image of the second frame is:

(12 megapixels)/3×2=8 megapixels.

In order that both of the first and second frames achieve a frame rate of 60 fps, the first frame requires a data transfer rate of:

(2.67 megapixels/frame)×(60 fps)=160 megapixels/second.

The second frame requires a data transfer rate of:

(8 megapixels/frame)×(60 fps)=480 megapixels/second.

If the output portion 28, which is an output interface (an output IF) of the image pickup device 4, is assumed to be capable of performing output at a rate of 40 megapixels/second (Mpix/sec) per lane (see FIG. 11 and the like), four lanes are used for the first frame and twelve lanes are used for the second frame. Therefore, from a view point of reducing power consumption, it is preferable to, for the first frame, stop eight lanes that are not used among the twelve lanes.

It is, however, difficult for the output portion 28 of the image pickup device 4 to perform mode switching for each frame. In the example described above, in order to secure 60 fps for the first and second frames, it is necessary to perform frame mode switching every 1/120 (seconds). However, from a viewpoint of a circuit scale of the output portion 28, which is the output IF of the image pickup device 4, such high-speed switching is difficult, and the first frame is also caused to operate with the twelve lanes according to the number of lanes for the second frame (that is, by adjusting the smaller number of lanes to the larger number of lanes) (at this time, eight lanes that are not used for the first frame output dummy data).

That is, the output portion 28 outputs both of the first and second frames via the transmission route 14 with a number of lanes that is not the smaller of a first number-of-lanes required to output the first frame and a second number-of-lanes required to output the second frame.

FIG. 11 shows such a state. As for the first frame (LV frame+phase difference information (TB)), lanes 0 to 3 output pixel data, while lanes 4 to 11 output dummy data. As for the second frame (phase difference information (RL)), the lanes 0 to 11 output pixel data.

Thus, at the time of switching between the first and second frames to output the first or second frame, an operation of outputting dummy data is required, for a frame using the smaller number of lanes to correspond to the larger number of lanes used. Therefore, not only power consumption of the output portion 28, which is the output IF, but also power consumption of the input portion 5, which is a receiving side (including, for example, the system control portion 13, the image signal processing portion 9 and the focus detection signal processing portion 8) such as an ASIC (application specific integrated circuit) (or a DSP (digital signal processor)) is large because a 12-lane RX (receiver) operation is always required of the input portion 5.

Therefore, in the present embodiment, the amount of data is reduced by half by performing the processing so that R pixel signals and B pixel signals are deleted to output only G pixel signals by the digital processing portion 27 as described with reference to FIGS. 8 to 10. A data transfer rate required for the second frame thereby becomes:

(480 megapixels/second)/2=240 megapixels/second.

Therefore, use of six lanes is sufficient for the second frame. And four lanes are also used for the first frame and dummy data can be sent by two lanes.

Thus, the output portion 28 is adapted to output both of the first and second frames via the transmission route 14 with the number of lanes that is not the smaller of the first number-of-lanes required to output the first frame for which the first mix processing has been performed and the second number-of-lanes required to output the second frame for which the second mix processing and the processing by the digital processing portion 27 have been performed.

More specifically, as for the first frame (LV frame+phase difference information (TB)), pixel data is outputted by the lanes 0 to 3, and dummy data is outputted by the lanes 4 and 5 as shown in FIG. 12. As for the second frame (phase difference information (RL)), pixel data is outputted by the lanes 0 to 5. For both of the first and second frames, operations of the lanes 6 to 11 (lanes that are not used for data transmission) can be stopped. At this time, operations of the output portion 28 and operations of the input portion 5 corresponding to the stopped lanes are also stopped.

According to the first embodiment as described above, since color information of the second frame that includes phase difference information is reduced to reduce the amount of data, and both of the first and second frames are outputted via the transmission route 14 with the number of lanes that is not the smaller of the first number-of-lanes required to output the first frame capable of constituting a color image and the second number-of-lanes required to output the second frame for which color information has been reduced, it is possible to increase the number of lanes the operations of which can be stopped in common for the first and second frames and reduce power consumption.

It is possible to thereby configure a low power-consumption image pickup device and image pickup apparatus that are capable of constituting image pixels and also capable of focus detection by image surface phase difference.

Further, since the first mix processing and the second mix processing are performed for the first and second frames, respectively, and both of the first and second frames are outputted via the transmission route 14 with the number of lanes that is not the smaller of the first number-of-lanes and the second number-of-lanes after the mix processing, it is possible to further reduce the number of pixels outputted from the image pickup device 4 and efficiently reduce power consumption.

If color information of the second frame is reduced to reduce the amount of data by deleting pixel signals of one or more colors among pixel signals of a plurality of colors read from color image pixels, it becomes possible to appropriately acquire necessary phase difference information while reducing the amount of data by simple processing, without a complicated signal operation.

At this time, by deleting R pixel signals and B pixel signals and configuring the second frame only with G pixel signals, it is possible to acquire phase difference information from the G pixel signals, which are signals corresponding to brightness, and it is widely preferable for general objects.

Further, since the processing for reducing color information of the second frame to reduce the amount of data is digitally done by the digital processing portion 27, a circuit configuration can be simpler than when analog processing is performed.

In addition, in the image pickup apparatus 1 provided with the image pickup device 4 and the transmission route 14 with the plurality of lanes configured to transmit data outputted from the image pickup device 4, power consumption of the transmission route 14 itself and, furthermore, power consumption of the input portion 5 and the like configured to receive data via the transmission route 14 can be appropriately reduced.

Second Embodiment

Figure 13:
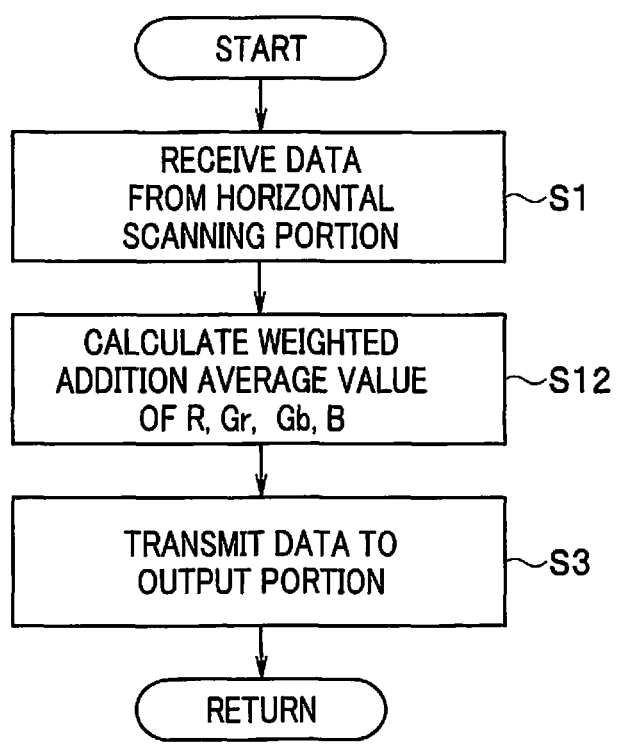
FIG. 13 is a flowchart showing processing performed for the second frame by the digital processing portion in a second embodiment of the present invention.
Figure 14:
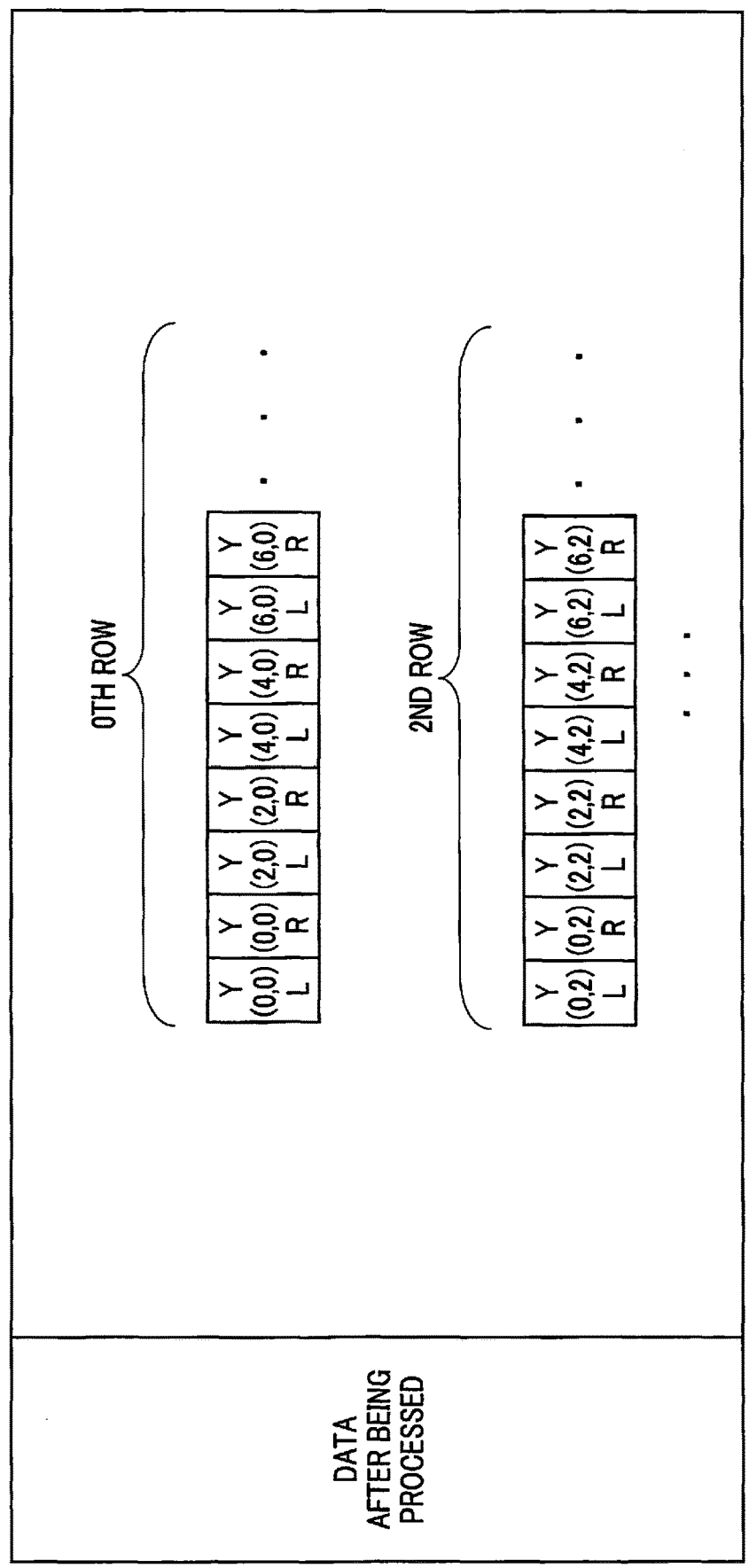
FIG. 14 is a diagram showing an example of data of the second frame after digital processing, which is outputted from the digital processing portion, in the second embodiment.
Figure 15:
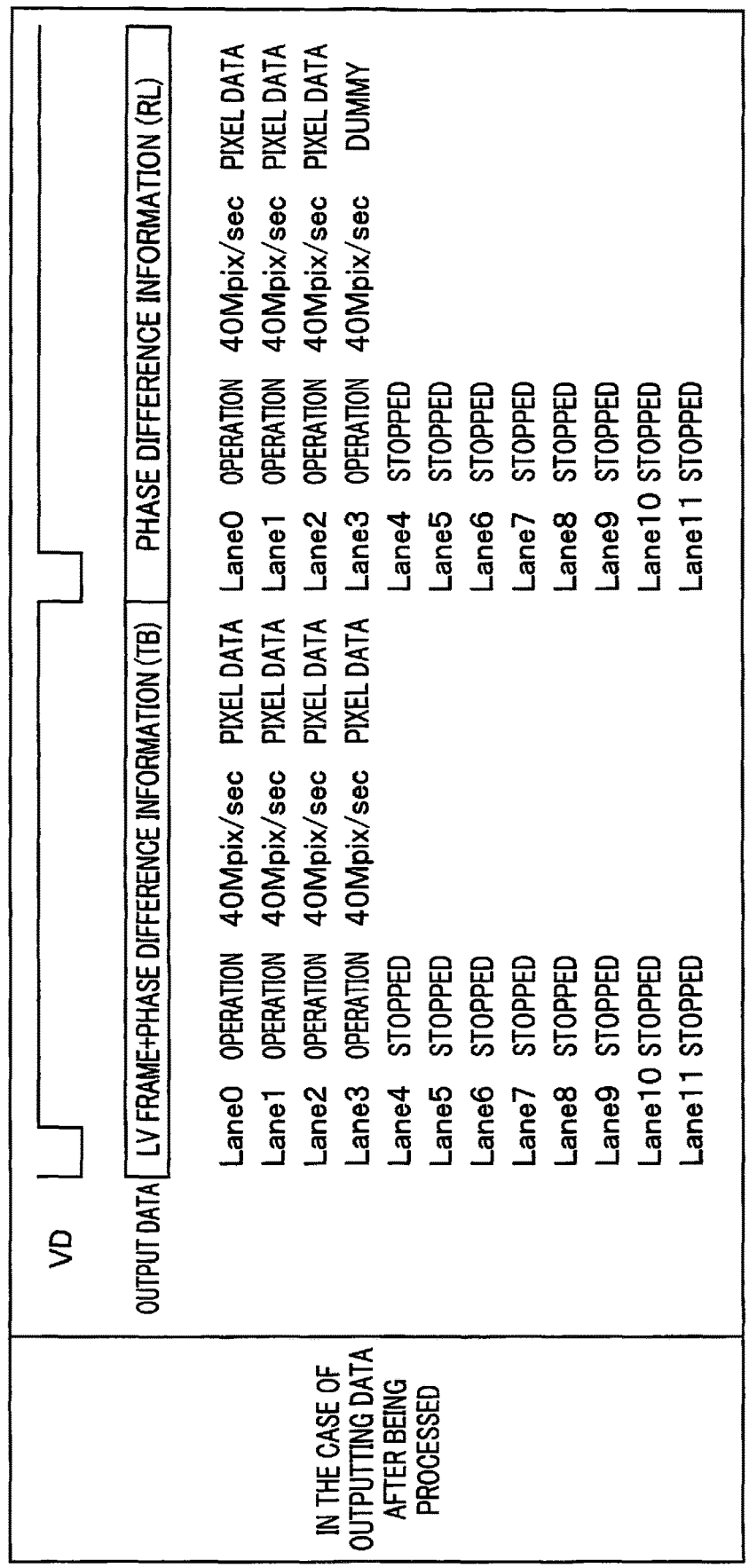
FIG. 15 is a diagram showing a usage state of each lane at the time of outputting pixel data from the output portion after the processing by the digital processing portion, in the second embodiment.

FIGS. 13 to 15 show a second embodiment of the present invention. FIG. 13 is a flowchart showing the processing performed for the second frame by the digital processing portion 27; FIG. 14 is a diagram showing an example of data of the second frame after digital processing, which is outputted from the digital processing portion 27; and FIG. 15 is a diagram showing a usage state of each lane at the time of outputting pixel data from the output portion 28 after the processing by the digital processing portion 27.

In the second embodiment, portions similar to portions of the first embodiment described above will be given the same reference numerals, and description will be appropriately omitted, and description will be made mainly on different points.

In the first embodiment described above, the processing for deleting R pixel signals and B pixel signals to leave G pixel signals, which are signals corresponding to brightness, is performed by the digital processing portion 27. In the present embodiment, however, an addition signal is calculated from R pixel signals, B pixel signals and G pixel signals, and the calculated addition signal is outputted as a signal of the second frame.

Configurations of the image pickup apparatus 1, the image pickup device 4 and the like are basically similar to the first embodiment described above. The processing performed by the digital processing portion 27 is different.

That is, when the processing shown in FIG. 13 is started and data of the second frame is received at step S1, the digital processing portion 27 performs the processing for reducing color information of the second frame to reduce the amount of data by adding up pixel signals of a plurality of colors read from color image pixels to generate an addition signal and configuring the second frame only with the generated addition signal. Here, when adding up the pixel signals of the plurality of colors to calculate the addition signal, simple addition may be performed (alternatively, weights h, i, j and k to be described later may be equally set to ¼). In the present embodiment, the addition signal is generated, for example, as a brightness signal by adding a weight for each color (that is, by performing weighted addition) (step S12).

More specifically, the digital processing portion 27 is adapted to calculate output data as shown in FIG. 14 by performing an arithmetic operation as shown below for left (L) focus detection pixel signals (and performing a similar arithmetic operation for right (R) focus detection pixel signals) based on the input data to the digital processing portion 27 as shown in FIG. 9.

$Y(0, 0)L = \{h \times R(0, 0)L + i \times GR(1, 0)L + j \times GB(0, 1)L + k \times B(1, 1)L\}$ $Y(2, 0)L = \{h \times R(2, 0)L + i \times GR(3, 0)L + j \times GB(2, 1)L + k \times B(3, 1)L\}$

...

$Y(2n, 0)L = \{h \times R(2n, 0)L +$
$\qquad i \times GR(2n + 1, 0)L + j \times GB(2n, 1)L + k \times B(2n + 1, 1)L\}$

...

$Y(2n, 2m)L = \{h \times R(2n, 2m)L + i \times GR(2n + 1, 2m)L +$
$\qquad j \times GB(2n, 2m + 1)L + k \times B(2n + 1, 2m + 1)L\}$ Here, (x,y) indicates coordinates (row number, column number) after the mix processing shown in FIG. 7; a left side of the coordinates (x,y) indicates the kind of a color signal, R (red), GR (green on the same row as red), GB (green on the same row as blue) or B (blue); and a right side of the coordinates (x,y) indicates right (R) or left (L) of a focus detection pixel. Further, n=0, 1, 2, . . . , m=0, 1, 2, . . . , and the weights h, i, j and k are real numbers between 0 and 1, including 0 and 1 (preferably, real numbers larger than 0 and smaller than 1) satisfying a normalization condition of h+i+j+k=1.

Thus, the digital processing portion 27 is adapted to generate an addition signal with the basic array of the Bayer array constituted by 2×2 pixels (the basic array after the mix processing in the case of performing the mix processing at a stage prior to the digital processing portion 27) as a unit (a set of pixel signals from which the addition signal is generated). The addition signal generated here may be temporarily stored in the memory in the digital processing portion 27 similarly to the first embodiment described above.

After that, the digital processing portion 27 performs the processing of step S3, transmits the addition signal to the output portion 28 as shown in FIG. 14 and returns to the main process not shown.

As seen from comparison between FIGS. 9 and 14, the amount of data outputted from the digital processing portion 27 is ¼ of the amount of data inputted to the digital processing portion 27.

In this case, a data transfer rate required for the second frame is:

(480 megapixels/second)/4=120 megapixels/second.

Therefore, use of three lanes is sufficient for the second frame. On the other hand, it is necessary to use four lanes for the first frame as described above. Therefore, as for the second frame, dummy data is sent by one lane.

In this case, the output portion 28 similarly outputs both of the first and second frames via the transmission route 14 with the number of lanes that is not the smaller of the first number-of-lanes required to output the first frame for which the first mix processing has been performed and the second number-of-lanes required to output the second frame for which the second mix processing and the processing by the digital processing portion 27 have been performed.

More specifically, as for the first frame (LV frame+phase difference information (TB)), pixel data is outputted by the lanes 0 to 3 as shown in FIG. 15. As for the second frame (phase difference information (RL)), pixel data is outputted by the lanes 0 to 2 and dummy data is outputted by the lane 3. For both of the first and second frames, operations of the lanes 4 to 11 (lanes that are not used for data transmission) can be stopped.

According to the second embodiment as described above, advantageous effects almost similar to the advantageous effects of the first embodiment described above are obtained; and since color information of the second frame is reduced to reduce the amount of data by configuring the second frame only with an addition signal generated by adding up pixel signals of a plurality of colors, it is possible to increase the number of lanes the operations of which are stopped and achieve much lower power consumption.

Further, by weighting each color and generating an addition signal as a brightness signal, it is possible to, for a general object, acquire focus detection pixel signals that are more appropriately responsible for phase difference information and perform image surface phase difference detection with a higher accuracy.

In the case of generating an addition signal with the basic array of the Bayer array constituted by 2×2 pixels as a unit, arithmetic processing becomes easy.

In the case of generating an addition signal by simple addition or by causing the weights h, i, j and k for pixel signals of the respective colors to be equally set to ¼, it becomes possible to further reduce a load on the arithmetic processing.

Third Embodiment

Figure 16:
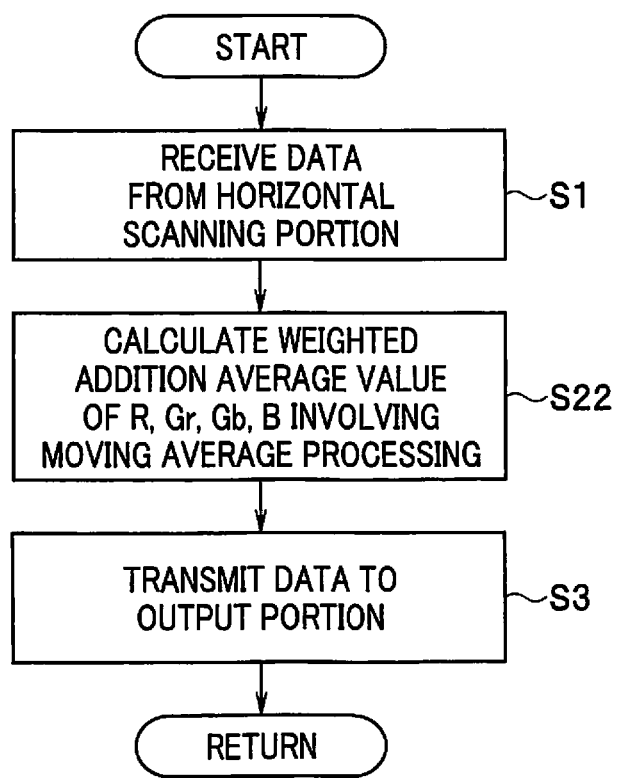
FIG. 16 is a flowchart showing processing performed for the second frame by the digital processing portion in a third embodiment of the present invention.
Figure 17:
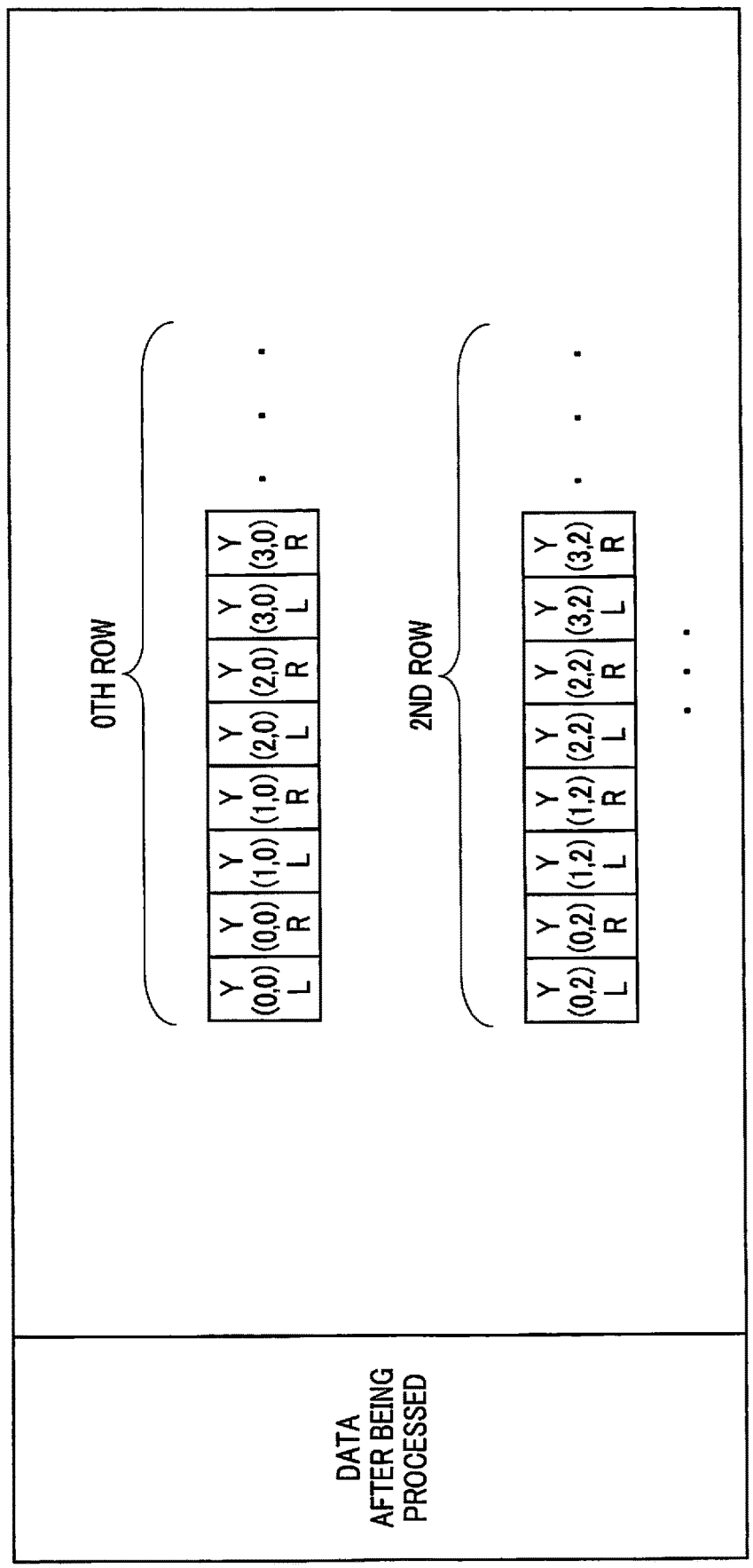
FIG. 17 is a diagram showing an example of data of the second frame after digital processing, which is outputted from the digital processing portion, in the third embodiment.
Figure 18:
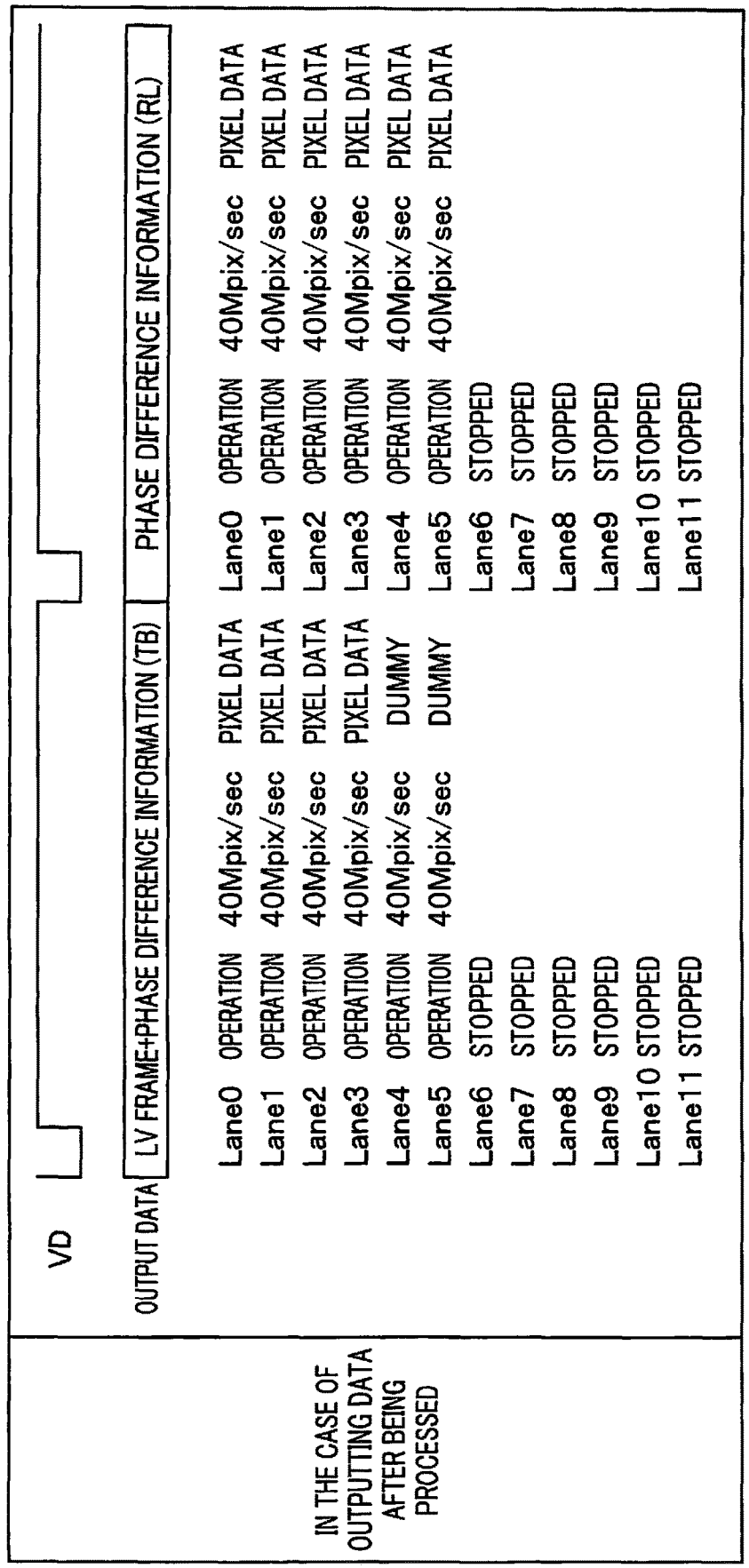
FIG. 18 is a diagram showing a usage state of each lane at the time of outputting pixel data from the output portion after the processing by the digital processing portion in the third embodiment.

FIGS. 16 to 18 show a third embodiment of the present invention. FIG. 16 is a flowchart showing the processing performed for the second frame by the digital processing portion 27; FIG. 17 is a diagram showing an example of data of the second frame after digital processing, which is outputted from the digital processing portion 27; and FIG. 18 is a diagram showing a usage state of each lane at the time of outputting pixel data from the output portion 28 after the processing by the digital processing portion 27.

In the third embodiment, portions similar to portions of the first and second embodiments described above will be given the same reference numerals, and description will be appropriately omitted, and description will be made mainly on different points.

In the second embodiment described above, an addition signal is generated with the basic array of the Bayer array as a unit. In the present embodiment, phase difference information can be detected more accurately by generating an addition signal with each of the basic array and a moving basic array obtained by moving the basic array by one image pixel as a unit in at least one of the row direction and the column direction.

Configurations of the image pickup apparatus 1, the image pickup device 4 and the like are basically similar to the first and second embodiments described above. The processing performed by the digital processing portion 27 is different.

That is, when the processing shown in FIG. 16 is started and data of the second frame is received at step S1, the digital processing portion 27 performs the processing for reducing color information of the second frame to reduce the amount of data by adding up pixel signals of a plurality of colors read from color image pixels to generate an addition signal and configuring the second frame only with the generated addition signal. However, the unit for generating the addition signal is, for example, each of the basic array of the Bayer array and a moving basic array obtained by moving the basic array by one image pixel in at least one of the row direction and the column direction.

When adding up the pixel signals of the plurality of colors to calculate the addition signal, simple addition may be performed (alternatively, weights h, i, j and k to be described later may be equally set to ¼). In the present embodiment, the addition signal is generated, for example, as a brightness signal by adding a weight for each color (that is, by performing weighted addition) similarly to the second embodiment described above.

Therefore, in the present embodiment, the digital processing portion 27 performs processing for calculating a weighted addition average value of color signals R, Gr, Gb and B constituting the basic array of the Bayer array, involving moving average processing (step S22).

More specifically, the digital processing portion 27 is adapted to calculate output data as shown in FIG. 17 by performing an arithmetic operation as shown below for left (L) focus detection pixel signals (and performing a similar arithmetic operation for right (R) focus detection pixel signals) based on the input data to the digital processing portion 27 as shown in FIG. 9.

$Y(0, 0)L = \{h \times R(0, 0)L + i \times GR(1, 0)L + j \times GB(0, 1)L + k \times B(1, 1)L\}$ $Y(1, 0)L = \{i \times GR(1, 0)L + h \times R(2, 0)L + k \times B(1, 1)L + j \times GB(2, 1)L\}$ $Y(2, 0)L = \{h \times R(2, 0)L + i \times GR(3, 0)L + j \times GB(2, 1)L + k \times B(3, 1)L\}$

...

$Y(2n, 0)L = \{h \times R(2n, 0)L +$ $i \times GR(2n + 1, 0)L + j \times GB(2n, 1)L + k \times B(2n + 1, 1)L\}$ $Y(2n + 1, 0)L = \{i \times GR(2n + 1, 0)L + h \times R(2n + 2, 0)L +$ $k \times B(2n + 1, 1)L + j \times GB(2n + 2, 1)L\}$

...

$Y(2n, 2m)L = \{h \times R(2n, 2m)L + i \times GR(2n + 1, 2m)L +$ $j \times GB(2n, 2m + 1)L + k \times B(2n + 1, 2m + 1)L\}$ $Y(2n + 1, 2m)L = \{i \times GR(2n + 1, 2m)L + h \times R(2n + 2, 2m)L +$ $k \times B(2n + 1, 2m + 1)L + j \times GB(2n + 2, 2m + 1)L\}$ Here, (x,y) indicates coordinates (row number, column number) after the mix processing shown in FIG. 7; a left side of the coordinates (x,y) indicates the kind of a color signal, R (red), GR (green on the same row as red), GB (green on the same row as blue) or B (blue); and a right side of the coordinates (x,y) indicates right (R) or left (L) of a focus detection pixel. Further, n=0, 1, 2, . . . , m=0, 1, 2, . . . , and the weights h, j and k are real numbers between 0 and 1, including 0 and 1 (preferably, real numbers larger than 0 and smaller than 1) satisfying a normalization condition of h+i+j+k=1.

Thus, the digital processing portion 27 is adapted to generate an addition signal with each of the basic array of the Bayer array constituted by 2×2 pixels (the basic array after the mix processing in the case of performing the mix processing at a stage prior to the digital processing portion 27) and a moving basic array obtained by moving the basic array by one image pixel as a unit in at least one of the row direction and the column direction.

In the example shown in the present embodiment, since the second frame acquires pieces of horizontal-direction phase difference information R and L, a moving basic array obtained by moving the basic array only in the row direction by one image pixel is used (that is, the basic array and the moving basic array overlap with each other by one image pixel only in the horizontal direction but do not overlap in the vertical direction). In a case where the second frame acquires pieces of vertical-direction phase difference information T and B, however, a moving basic array obtained by moving the basic array only in the column direction by one image pixel can be used (that is, the basic array and the moving basic array can be caused to overlap with each other by one image pixel only in the vertical direction but not to overlap in the horizontal direction).

Then, the addition signal generated here may be temporarily stored in the memory in the digital processing portion 27 similarly to the first and second embodiments described above.

After that, the digital processing portion 27 performs the processing of step S3, transmits the addition signal to the output portion 28 as shown in FIG. 17 and returns to the main process not shown.

As seen from comparison between FIGS. 9 and 17, the amount of data outputted from the digital processing portion 27 is ½ of the amount of data inputted to the digital processing portion 27.

In this case, a data transfer rate required for the second frame is:

(480 megapixels/second)/2=240 megapixels/second.

Therefore, use of six lanes is sufficient for the second frame. Therefore, as for the first frame, four lanes are used and dummy data can be sent with two lanes.

In this case, the output portion 28 similarly outputs both of the first and second frames via the transmission route 14 with the number of lanes that is not the smaller of the first number-of-lanes required to output the first frame for which the first mix processing has been performed and the second number-of-lanes required to output the second frame for which the second mix processing and the processing by the digital processing portion 27 have been performed.

More specifically, as for the first frame (LV frame+phase difference information (TB)), pixel data is outputted by the lanes 0 to 3, and dummy data is outputted by the lanes 4 and 5 as shown in FIG. 18. As for the second frame (phase difference information (RL)), pixel data is outputted by the lanes 0 to 5. For both of the first and second frames, operations of the lanes 6 to 11 (lanes that are not used for data transmission) can be stopped.

According to the third embodiment as described above, advantageous effects almost similar to the advantageous effects of the first and second embodiments described above are obtained; and since an addition signal is generated with each of the basic array and a moving basic array obtained by moving the basic array by one image pixel as a unit in at least one of the row direction and the column direction, it becomes possible to acquire more accurate phase difference information in comparison with the case of generating an addition signal with only the basic array as a unit.

Note that although an example of performing mix processing at a stage prior to the signal processing portion (the signal processing circuit) configured to perform the processing for reducing color information of the second frame to reduce the amount of data (more specifically, in the analog processing portion 23) has been described in each embodiment described above, it is also possible to, in the case of performing the mix processing at a stage after the signal processing portion (the signal processing circuit) and prior to the output portion (the output circuit) (between the signal processing portion (the signal processing circuit) and the output portion (the output circuit), obtain advantageous effects similar to the advantageous effects described above by the output portion (the output circuit) outputting both of the first and second frames via the transmission route 14 with the number of lanes that is not the smaller of the first number-of-lanes required to output the first frame for which the first mix processing has been performed and the second number-of-lanes required to output the second frame for which the second mix processing and the processing by the signal processing portion (the signal processing circuit) have been performed.

Although an example of performing the mix processing for both of the first and second frames has been described in each embodiment described above because a live view is assumed, it is also possible to, even in the case of performing the mix processing for only one of the frames or in the case of performing the mix processing for neither of the frames, apply the above-stated technique of increasing the number of lanes the operations of which are to be stopped (that is, the output portion 28, which is an output circuit, can be caused to output both of the first and second frames via the transmission route 14 with the number of lanes that is not the smaller of the first number-of-lanes required to output the first frame and the second number-of-lanes required to output the second frame processed by the signal processing portion (the signal processing circuit). An example of performing the mix processing for neither the first frame nor the second frame will be given. If all of image pixels are outputted by the first frame, and all of focus detection pixels for detecting a horizontal-direction (or vertical-direction) phase difference are outputted by the second frame, the number of output pixels of the second frame is twice as large as the number of output pixels of the firsts frame. Therefore, by applying the technique described above to reduce the number of output pixels of the second frame, the number of lanes the operations of which can be stopped for the first and second frames in common can be increased.

Furthermore, the processing by each portion described above may be performed by one or more processors configured as hardware. For example, each portion may be a processor configured as an electronic circuit, or may be a circuit portion in a processor configured as an integrated circuit such as an FPGA (field programmable gate array). Alternatively, a processor configured with one or more CPUs may execute a function as each portion by reading and executing a processing program recorded in a recording medium.

Though an image pickup device and an image pickup apparatus have mainly been described in the above description, a control method for controlling the image pickup device (or the image pickup apparatus) as described above, a processing program for causing a computer to perform processing similar to the processing of the image pickup device (or the image pickup apparatus), a computer-readable non-transitory recording medium in which the processing program is recorded, and the like are also possible.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:
1. An image pickup device for outputting data via a transmission route with a plurality of lanes, the image pickup device comprising:
   a pixel area where color image pixels are arrayed in a matrix, and each of the image pixels is divided into a plurality of focus detection pixels;
   a reading circuit configured to read a first frame capable of constituting a color image and a second frame including phase difference information from the pixel area;
   a signal processing circuit configured to perform processing for reducing color information of the second frame to reduce an amount of data; and
   an output circuit configured to output both of the first frame and the second frame via the transmission route with a number of lanes that is not the smaller of a first number-of-lanes required to output the first frame and a second number-of-lanes required to output the second frame processed by the signal processing circuit.

2. The image pickup device according to claim 1, further comprising a mix processing circuit configured to perform mix processing for generating one pixel signal from a plurality of pixel signals, perform first mix processing for the first frame and perform second mix processing for the second frame; wherein
   the output circuit outputs both of the first frame and the second frame via the transmission route with the number of lanes that is not the smaller of the first number-of-lanes required to output the first frame after the first mix processing is performed and the second number-of-lanes required to output the second frame after the second mix processing and the processing by the signal processing circuit are performed.

3. The image pickup device according to claim 1, wherein the signal processing circuit performs the processing for reducing the color information of the second frame to reduce the amount of data, by deleting pixel signals of one or more colors among pixel signals of a plurality of colors read from the color image pixels.

4. The image pickup device according to claim 3, wherein the pixel signals of the plurality of colors are R pixel signals, G pixel signals and B pixel signals, and the signal processing circuit performs the processing for reducing the color information of the second frame to reduce the amount of data, by deleting the R pixel signals and the B pixel signals and configuring the second frame only with the G pixel signals.

5. The image pickup device according to claim 1, wherein the signal processing circuit performs the processing for reducing the color information of the second frame to reduce the amount of data, by adding up the pixel signals of the plurality of colors read from the color image pixels to generate an addition signal and configuring the second frame only with the generated addition signal.

6. The image pickup device according to claim 5, wherein the signal processing circuit generates the addition signal as a brightness signal by adding a weight for each color when adding up the pixel signals of the plurality of colors.

7. The image pickup device according to claim 5, wherein
   the color image pixels are arrayed in the pixel area with a Bayer array constituted by 2×2 pixels as a basic array; and
   the signal processing circuit generates the addition signal with the basic array as a unit.

8. The image pickup device according to claim 5, wherein
   the color image pixels are arrayed in the pixel area with a Bayer array constituted by 2×2 pixels as a basic array; and
   the signal processing circuit generates the addition signal with each of the basic array and a moving basic array obtained by moving the basic array by one image pixel as a unit in at least one of a row direction and a column direction.

9. The image pickup device according to claim 1, further comprising an analog-digital conversion processing circuit provided on a preceding stage side of the signal processing circuit and configured to convert an analog signal read from the pixel area by the reading circuit to a digital signal; wherein
   the signal processing circuit performs the processing for reducing the color information of the second frame to reduce the amount of data, by digital processing.

10. An image pickup apparatus comprising:
   the image pickup device according to claim 1; and
   a transmission route with a plurality of lanes configured to transmit data outputted from the image pickup device; wherein
   an operation of the transmission route is stopped for a lane that is not used for transmission of data among the plurality of lanes of the transmission route.

11. A method for controlling an image pickup apparatus, the image pickup apparatus comprising: an image pickup device comprising a pixel area where color image pixels are arrayed in a matrix, and each of the image pixels is divided into a plurality of focus detection pixels, and a transmission route with a plurality of lanes configured to transmit data outputted from the image pickup device, the method comprising:

reading from the pixel area a first frame capable of constituting a color image and a second frame including phase difference information;
performing signal processing for reducing color information of the second frame to reduce an amount of data;
outputting both of the first frame and the second frame via the transmission route with a number of lanes that is not the smaller of a first number-of-lanes required to output the first frame and a second number-of-lanes required to output the signal-processed second frame; and
stopping an operation of the transmission route for a lane that is not used for transmission of data among the plurality of lanes of the transmission route.

12. The image pickup apparatus control method according to claim 11, further comprising:

performing first mix processing for generating one pixel signal from a plurality of pixel signals, for the first frame; and
performing second mix processing for generating one pixel signal from a plurality of pixel signals, for the second frame; wherein
the first number-of-lanes is the number of lanes required to output the first frame after the first mix processing is performed; and
the second number-of-lanes is the number of lanes required to output the second frame after the second mix processing and the signal processing are performed.

13. The image pickup apparatus control method according to claim 11, wherein the signal processing is processing for reducing the color information of the second frame to reduce the amount of data, by deleting pixel signals of one or more colors among pixel signals of a plurality of colors read from the color image pixels.

14. The image pickup apparatus control method according to claim 11, wherein the signal processing is processing for reducing the color information of the second frame to reduce the amount of data, by adding up the pixel signals of the plurality of colors read from the color image pixels to generate an addition signal and configuring the second frame only with the generated addition signal.

15. A computer-readable non-transitory recording medium in which a processing program for controlling an image pickup apparatus is recorded, the image pickup apparatus comprising: an image pickup device comprising a pixel area where color image pixels are arrayed in a matrix and each of the image pixels is divided into a plurality of focus detection pixels, and a transmission route with a plurality of lanes configured to transmit data outputted from the image pickup device; wherein the processing program is a program for causing a computer to perform:
reading from the pixel area a first frame capable of constituting a color image and a second frame including phase difference information;
signal processing for reducing color information of the second frame to reduce an amount of data;
outputting both of the first frame and the second frame via the transmission route with a number of lanes that is not the smaller of a first number-of-lanes required to output the first frame and a second number-of-lanes required to output the signal-processed second frame; and
stopping an operation of the transmission route for a lane that is not used for transmission of data among the plurality of lanes of the transmission route.

16. The computer-readable non-transitory recording medium in which the processing program is recorded according to claim 15, wherein the processing program is a program for further causing the computer to perform:
first mix processing for generating one pixel signal from a plurality of pixel signals, for the first frame; and
second mix processing for generating one pixel signal from a plurality of pixel signals, for the second frame; wherein
the first number-of-lanes is the number of lanes required to output the first frame after the first mix processing is performed; and
the second number-of-lanes is the number of lanes required to output the second frame after the second mix processing and the signal processing are performed.

17. The computer-readable non-transitory recording medium in which the processing program is recorded according to claim 15, wherein the signal processing is processing for reducing the color information of the second frame to reduce the amount of data, by deleting pixel signals of one or more colors among pixel signals of a plurality of colors read from the color image pixels.

18. The computer-readable non-transitory recording medium in which the processing program is recorded according to claim 15, wherein the signal processing is processing for reducing the color information of the second frame to reduce the amount of data, by adding up the pixel signals of the plurality of colors read from the color image pixels to generate an addition signal and configuring the second frame only with the generated addition signal.

* * * * *